(12) United States Patent
Westfall et al.

(10) Patent No.: US 10,149,494 B2
(45) Date of Patent: *Dec. 11, 2018

(54) METHOD OF PRODUCING AN AROMATISED FOOD OR BEVERAGE PRODUCT

(71) Applicant: NESTEC S.A., Vevey (CH)

(72) Inventors: Scott A. Westfall, Marysville, OH (US); William Wu, Dublin, OH (US); Annette Michelle Birch, Chardonne (CH); Amber Christine Scarlatos, Marysville, OH (US)

(73) Assignee: Nestec S.A., Vevey (CH)

( * ) Notice: Subject to any disclaimer, the term of this patent is extended or adjusted under 35 U.S.C. 154(b) by 17 days.

This patent is subject to a terminal disclaimer.

(21) Appl. No.: 14/646,472

(22) PCT Filed: Nov. 29, 2013

(86) PCT No.: PCT/EP2013/075060
§ 371 (c)(1),
(2) Date: May 21, 2015

(87) PCT Pub. No.: WO2014/083146
PCT Pub. Date: Jun. 5, 2014

(65) Prior Publication Data
US 2015/0272183 A1    Oct. 1, 2015

Related U.S. Application Data

(60) Provisional application No. 61/732,041, filed on Nov. 30, 2012.

(51) Int. Cl.
| | | |
|---|---|---|
| A23F 5/26 | (2006.01) |
| A23F 5/32 | (2006.01) |
| A23L 27/10 | (2016.01) |
| A23L 2/56 | (2006.01) |
| A23F 3/42 | (2006.01) |
| A23F 5/48 | (2006.01) |
| A23F 5/50 | (2006.01) |
| A23L 27/28 | (2016.01) |
| A23L 27/29 | (2016.01) |

(52) U.S. Cl.
CPC ............... *A23L 27/115* (2016.08); *A23F 3/42* (2013.01); *A23F 5/486* (2013.01); *A23F 5/505* (2013.01); *A23L 2/56* (2013.01); *A23L 27/28* (2016.08); *A23L 27/29* (2016.08); *A23V 2002/00* (2013.01)

(58) Field of Classification Search
CPC .......... A23F 5/486; A23F 5/505; A23F 3/426; A23F 5/465; A23F 5/48; A23F 5/46; A23F 5/265; A23F 5/28; A23F 5/483; A23F 5/243; A23F 3/405; A23F 5/18; A23F 5/26

See application file for complete search history.

(56) References Cited

U.S. PATENT DOCUMENTS

| | | | |
|---|---|---|---|
| 3,810,999 A | 5/1974 | Balling et al. | |
| 3,823,241 A * | 7/1974 | Patel et al. | ............... A23F 5/486 426/386 |
| 4,072,761 A * | 2/1978 | Margolis | .................. A23F 5/486 261/DIG. 26 |
| 5,171,595 A | 12/1992 | Hsu et al. | |
| 7,056,546 B2 * | 6/2006 | Zheng | ..................... A23F 5/243 426/312 |
| 2007/0231443 A1* | 10/2007 | Goto | ........................ A21D 2/00 426/594 |

FOREIGN PATENT DOCUMENTS

WO    2004028261    4/2004

* cited by examiner

*Primary Examiner* — Hong T Yoo
(74) *Attorney, Agent, or Firm* — K&L Gates LLP

(57) ABSTRACT

The present invention relates to a method of producing an aromatized food or beverage product, wherein an aroma fraction is obtained from a plant extract, said aroma fraction is being contacted with an oil to remove undesired aroma compounds, and the aroma fraction from which undesired compounds have been removed are combined with a food or beverage composition to produce an aromatized food or beverage product.

20 Claims, No Drawings

METHOD OF PRODUCING AN AROMATISED FOOD OR BEVERAGE PRODUCT

CROSS REFERENCE TO RELATED APPLICATIONS

The present application is a National Stage of International Application No. PCT/EP2013/075060, filed on Nov. 29, 2013, which claims priority to U.S. Provisional Patent Application No. 61/732,041, filed on Nov. 30, 2012, the entire contents of which are being incorporated herein by reference.

FIELD OF THE INVENTION

The present invention relates to a method of producing aromatised food and beverage products, wherein undesired aroma compounds are removed.

BACKGROUND

Aroma compounds from plant materials are important constituents or ingredients for many food and beverage products. They may be present in plant materials used for producing a food or beverage product and carried directly over into the food or beverage product, or they may be recovered separately from plant material and added as an ingredient to a food or beverage composition. Well known aroma compounds of importance for the food and beverage industry are e.g. aroma compounds from coffee, tea, and cocoa. Aroma compounds present in plant material ingredients may be lost during processing of the plant material into a food or beverage product, volatile aroma compounds may e.g. be lost during thermal processing steps. To avoid this loss aroma compounds may e.g. be recovered from the plant material before the processing steps that leads to their loss, or during the initial processing, and may be added back after the processing steps which would otherwise have led to the loss of said aroma compounds. Methods for doing this are e.g. well known in the production of soluble coffee. During soluble coffee production coffee beans are extracted with water at elevated temperatures, e.g. up to between 120 and 180° C., which would normally lead to a loss of volatile aroma compounds that are important for the final soluble coffee products. These aroma compounds may be recovered from the coffee beans before the high temperature extraction, e.g. by steam stripping of the coffee beans, and may then be added back to the coffee extract after the high temperature extraction. Such methods are e.g. disclosed in WO 01/13735 and WO 99/52378. However, in some instances such methods may also recover aroma compounds that are undesired in the final product. For example, the volatile aroma fraction of roasted coffee beans, especially roasted *Robusta* coffee beans, contains some aroma compounds which may impart undesired aroma notes to the final product. The volatile fraction of roasted *Robusta* coffee bean aroma may e.g. impart notes to a final soluble coffee product that are often characterised as "harsh" or "rubber", "woody", "earthy", "chemical" or "phenolic" notes. There is thus a need for methods of selectively removing such undesired compounds from plant material aromas, specifically from coffee aroma. Such methods would allow an improvement of the aroma of food and beverage products comprising aroma derived from plant material. Such methods may, for example, be used to improve the aroma of food and beverage products, e.g. soluble coffee products, comprising aroma derived from roasted *robusta* coffee beans. This could e.g. allow the use of higher proportions of *robusta* coffee beans in coffee blends used for producing soluble coffee without imparting the undesired aroma notes of *robusta* coffee to the final product.

Consequently, it is an object of the present invention to provide methods for producing aromatised food and beverage products wherein undesired aroma fractions are removed from plant material derived aroma fractions. Specifically, it is an object to provide methods for producing aromatised food and beverage products comprising coffee aroma, wherein undesired aroma compounds are removed from the coffee aroma. A further object is to provide methods for producing a food or beverage product, e.g. a soluble coffee product, comprising aroma from roasted *robusta* coffee beans, wherein undesired compounds are removed from the roasted *robusta* coffee bean aroma.

SUMMARY OF THE INVENTION

The inventors have found that undesired aroma compounds can be removed from plant extracts by contacting an aroma fraction of a plant extract with an oil. Accordingly, the present invention relates to a method of producing an aromatised food or beverage product, the method comprising: a) collecting an aroma fraction from a plant material in the form of a gas comprising water vapour; b) contacting said aroma fraction with an oil to remove undesired aroma compounds; c) condensing said aroma fraction to produce an aqueous aroma containing liquid; and d) combining said aqueous aroma containing liquid from which undesired aroma compounds have been removed, with a food or beverage composition; wherein step c) is performed before or after step b).

DETAILED DESCRIPTION OF THE INVENTION

As understood herein, a plant material is any material from any plant that may be used for recovering aroma compounds. A plant material may e.g. be stem, leaf, root, flower, flower buds, fruits and/or seeds of a plant. Suitable plants are e.g. coffee (*Coffea*), e.g. Arabica coffee (*Coffea arabica*), Robusta coffee (*Coffea canephora*); tea (*Camellia sinensis*); chicory (*Cichorium intybus*); and cocoa (*Theobroma cacao*). Plant material may e.g. be selected among coffee beans, coffee extract, tea leaves, cocoa, tea extract, fruit, and fruit juice. In a preferred embodiment of the invention a plant material is derived from a coffee plant, in a further preferred embodiment a plant material is coffee bean, preferably roast and ground coffee beans. Roast and ground coffee beans may e.g. be *Arabica* coffee beans, *Robusta* coffee beans, or a blend thereof. In a preferred embodiment a plant material is a blend of roasted *Arabica* and *Robusta* coffee beans, preferably comprising between about 5% and 100% *Robusta* coffee beans by weight, more preferably between about 15% and 100% *Robusta* coffee beans by weight.

According to the process of present invention, an aroma fraction is collected from a plant material, the aroma fraction being in the form of a gas or liquid that comprises water or water vapour. The aroma fraction may be collected by any suitable method known to the skilled person, for example by stripping of a plant material or an extract of a plant material with a gas such as e.g. steam. The plant material may be treated in any suitable way to facilitate the release of the desired aroma compounds, the plant material may e.g. be cut, milled or ground into smaller pieces to increase the surface from which aroma compounds may be released, and/or the plant material may be extracted with a liquid, e.g. water, and the aroma fraction may be recovered from the liquid extract. The plant material, or the extract thereof, may be subjected to heating and reduced pressure to facilitate the release of volatile aroma compounds. If the plant material is roasted coffee beans, the aroma may e.g. be collected as grinder gas during grinding of the roasted coffee beans; by stripping aroma from an aqueous slurry or extract of roast and ground coffee beans, and/or by stripping of the roast and ground coffee beans, e.g. with steam. Methods for stripping aroma from roast and ground coffee beans are well known in the art, e.g. from WO 01/13735 and WO 99/52378;

According to the method of the invention, the aroma fraction in the form of a gas comprising water vapour is condensed to provide an aqueous aroma containing liquid. The condensation brings all, or part, of the water vapour in the aroma fraction unto the liquid form. The resulting aqueous liquid will comprise part of the aroma compounds of the gaseous aroma fraction that are condensed together with the water. Condensation may be performed by any suitable method, e.g. by cooling and/or compression. Condensation may be performed before and/or after contacting the aroma fraction with an oil. Methods of condensing water vapour from gasses is well known in the art, and may include setting the gas under pressure in a compressor and/or cooling the gas in a heat exchanger.

After the condensation step, part of the aroma fraction in gas form comprising water vapour may not be condensed and remain in the gaseous state. This remaining gas may be subjected to one or more further condensation steps to produce one or more further aroma fractions. These further aroma fractions may be combined with the aqueous aroma containing liquid obtained by the first condensation step, or may be used for other purposes.

The aroma fraction collected from the plant material is contacted with an oil to remove undesirable aroma compounds. The contact with an oil may be performed before condensing the aroma fraction, when the aroma fraction is in the form of a gas, or it may be performed after condensing the aroma fraction, when the aroma fraction is in the form of an aqueous aroma containing liquid. The contact with oil can thus be performed as a contact between the oil and a gaseous aromatic fraction and/or between an oil and an aqueous aroma containing liquid. By contacting the aroma fraction with an oil part of the aroma compounds present in the fraction will be transferred to the oil, including undesirable compounds, and thus removed from the aroma fraction. If the plant material is roast and ground coffee beans, undesirable compounds that may be removed are e.g. Furans, Pyrroles and/or Thiols, such as e.g. 2-(2-Furylmethyl)-5-methylfuran, 2,2'-Methylenedifuran, 1-Benzofuran, 1-ethyl-1h-pyrrole, thiophene, 2-[(Methylsulfanyl)methyl]furan, and/or 2-methylfuran. Undesirable aroma compounds in coffee aroma, especially derived from roast *Robusta* coffee beans, have been found to be able to impart undesired aroma notes to the final food or beverage product, such as "harsh" or "rubber", "woody", "earthy", "chemical" or "phenolic" notes.

Any suitable method for contact of the aroma fraction with an oil may be used, such methods are well known in the art. Any suitable oil may be used, preferably a food grade oil. The oil is preferably a vegetable oil or a vegetable oil fraction, such as e.g. coffee oil, soybean oil, corn oil, safflower oil, coconut oil, and/or Medium Chain Triglyceride (MCT) oil, or a fraction thereof.

Traditional solvent extraction technologies may be used if the contact is performed as a contact between liquid oil and a liquid aroma containing fraction. Various column devices, mixer-settlers, etc. are known in the art and may be applied to optimise the area of contact between the liquids, and the separation of the liquids. Membrane based technologies may also be applied, as membranes may be used to immobilise the surface between the oil and the aqueous liquid, and problems such as emulsification and other difficulties in separating the liquid phases may be avoided. In a preferred embodiment of the invention, step c) is performed before step b), and a porous hydrophobic membrane is used to contact the aqueous aroma containing liquid and the oil in step b). This may e.g. be performed in a system with hollow fibres of a hydrophobic membrane material wherein the oil is present on the inside of the hollow fibres and the aqueous liquid on the outside and the contact takes place at the membrane surface. In another embodiment the aqueous liquid is present within the hollow fibres and the oil located outside the hollow fibres. The contacting may be done continuously by streaming the aqueous aroma containing liquid and the oil, in either a counter-current or co-current manner. A hydrophobic membrane material with a pore size suitable to prevent mixing of the fluid streams may be used. A preferred membrane material is a polypropylene membrane with an average pore size between about 0.01 and 0.05 μm. The aqueous stream is preferably maintained at slightly higher pressure than the oil stream, such that a slight pressure gradient across the membrane is maintained to prevent dispersion of the liquid streams. Due to the hydrophobic nature of the membrane and the surface tension of the aqueous stream with the membrane, the aqueous stream does not penetrate the membrane even when slight pressure is applied. Thus dispersion of the two fluid streams is prevented. A suitable system is e.g. disclosed in Baudot, et al. (2001): Liquid-Liquid Extraction of Aroma Compounds with Hollow Fiber Contactor. AIChE Journal 47, 1780-1793.

If the contact with an oil is performed when the aroma fraction is in the form of a gas, any suitable method for contacting a gas with an oil for transferring aroma compounds may be used, e.g. a gas-liquid absorption column, bubble diffusers and spray columns. In a preferred embodiment, step c) is performed after step b), and step b) is performed in a gas-liquid absorption column.

In one embodiment only part of the aroma fraction is contacted with an oil. The remaining part may e.g. be discarded, or may e.g. be combined with the part that is contacted with an oil, after the oil contact. By contacting only part of the aroma fraction with oil, and recombining the contacted and un-contacted parts, the amount of aroma compounds that are removed may be controlled.

In one embodiment of the invention, the aqueous aroma containing liquid from which undesired aroma compounds have been removed and the food or beverage composition in step d) are further combined with a second aroma containing liquid produced by a method comprising: i) collecting an aroma fraction from a plant material in the form of a gas comprising water vapour; and ii) condensing said aroma fraction to produce an aqueous aroma containing liquid. The second aroma containing liquid is preferably derived from the same plant material as the aqueous aroma containing liquid from which undesired aroma compounds have been removed.

As a result of contacting the aroma fraction with oil to remove undesirable compounds, and condensing the aroma fraction, an aqueous aroma containing liquid from which undesirable compounds have been removed is produced. Said aqueous aroma containing liquid from which undesirable compounds have been removed is combined with a food or beverage composition to produce an aromatised food or beverage product. The aqueous aroma containing liquid from which undesirable compounds have been removed is preferably oil free when being combined with a food or beverage composition. In one embodiment of the invention the aqueous aroma containing liquid from which undesirable compounds have been removed comprises less than 5% oil by weight, preferably less than 2%, or less than 1% oil by weight. By a food or beverage composition is used any composition suited for forming an aromatised food or beverage product by addition of said aqueous aroma containing liquid from which undesirable compounds have been removed. A food or beverage composition may e.g. be a coffee product, such as e.g. a soluble coffee extract; a tea product, such as e.g. a soluble tea extract; a creamer composition, such as e.g. a coffee and/or tea creamer; a cocoa product, such as e.g. a cocoa powder, cocoa suspension and/or a cocoa extract; a dairy product, such as e.g. milk, yoghurt, cream, ice cream and/or cheese; a dessert product, such as e.g. a mousse or pudding; and/or a baked product, such as e.g. bread or cake.

In a preferred embodiment, the plant material is roast and ground coffee beans and the aqueous aroma containing liquid from which undesired aroma compounds have been removed is combined with a coffee extract in step b), to produce an aromatised coffee extract.

In one embodiment, the method of the invention further comprises drying the aromatised food or beverage product to produce a dried aromatised food or beverage product. Drying may be performed by any suitable method known in the art, e.g. freeze drying, spray drying, or roller drying. If the aromatised food or beverage composition is a soluble coffee extract, drying is preferably performed by spray drying or freeze drying.

A preferred embodiment of the invention is a method for producing an aromatised soluble coffee product, the method comprising:
  i) collecting an aroma fraction from roast and ground coffee, or an extract thereof, in the form of a gas comprising water vapour;
  ii) condensing said aroma fraction to produce an aqueous aroma containing liquid;
  iii) contacting said aroma containing liquid with an oil to remove undesired aroma compounds; and
  iv) combining said aqueous aroma containing liquid from which undesired aroma compounds have been removed, with a soluble coffee extract;
    wherein the roast and ground coffee from which aroma is collected comprised at least 5% robusta coffee by weight.

Another preferred embodiment of the invention is a method for producing an aromatised soluble coffee product, the method comprising:
  i) collecting an aroma fraction from roast and ground coffee, or an extract thereof, in the form of a gas comprising water vapour;
  ii) contacting said gaseous aroma fraction with an oil to remove undesired aroma compounds;
  iii) condensing said gaseous aroma fraction having been contacted with an oil, to produce an aqueous aroma containing liquid;
  iv) combining said aqueous aroma containing liquid from which undesired aroma compounds have been removed, with a food or beverage composition;
    wherein the roast and ground coffee from which aroma is collected comprised at least 5% robusta coffee by weight.

EXAMPLES

Example 1

Aqueous coffee aroma was stripped from wetted roast and ground 100% Robusta coffee and condensed, using the method disclosed in WO 01/13735. Following aroma removal two product streams were obtained, wetted stripped coffee grounds and an aqueous aroma.

The stripped wetted roast and ground coffee was extracted with water by the method disclosed in EP 0826308 to produce an aqueous coffee extract. The extract was then clarified using a centrifuge to remove insoluble sediment and evaporated to obtain a concentrate of approximately 49% soluble coffee solids.

The aqueous aroma collected from the coffee was split into two batches. One represented 4.6% of the dry roast and ground coffee weight and the other represented 8.4% of the dry roast and ground coffee weight. The 4.6% portion of the coffee aroma was supplied to the shell side of a series of two aroma contactors. MCT oil was also supplied in a counter-current manner to lumen side of the membrane contactors at a ratio of 250:1 aqueous aroma feed to oil feed. The aroma contactors were comprised of a bundle of approximately 10,000 porous polypropylene tubes with an average pore size of 0.3. The contact area between the aqueous aroma and the MCT oil was approximately 2.8 $m^2$ Residence time of the coffee aroma within the contactors was approximately 40 seconds. The residence time of coffee oil in the contactors was 25 minutes. Approximately 0.5 bars of backpressure was maintained on the aqueous coffee aroma as it was fed through the contactors.

Following treatment, both aroma streams were added to the concentrated coffee solids and spray dried to produce a soluble coffee powder using standard soluble coffee processing technology. The soluble coffee produced was tasted by a trained sensory panel of six people and found to have more Coffeeness and less Robusta character (woody and rubber notes) than powder with aroma that was not treated with the membrane contactor. In addition aqueous aroma samples were analyzed before and after treatment in the aroma oil contactor. Results of select aroma compounds are summarized in the table below.

TABLE 1

Select GC data showing change in aroma composition following aroma fractionation using a Membrane Contactor with MCT oil on the lumen side of the contactor and aqueous coffee aroma on the shell side of the contactor. Aroma composition reported on 0.5 g roast and ground equivalent.

| Compound | Log Kow* | Kow | Retention | Aroma prior to treatment in the aroma contactor | Aroma following treatment in the aroma contactor | % Change in Aroma Compound |
|---|---|---|---|---|---|---|
| 2-furylmethyl fomate | 0.9 | 7.943282347 | 19.049 | 0.031 | 0.02 | 35.48 |
| Benzaldehyde | 1.48 | 30.1995172 | 21.691 | 0.013 | 0.009 | 30.77 |
| 2-ethyl-5-methylpyrazine | 1.53 | 33.88441561 | 21.563 | 0.026 | 0.02 | 23.08 |
| thiophene | 1.81 | 64.5654229 | 8.983 | 0.029 | 0.018 | 37.93 |
| 2-methylfuran | 1.85 | 70.79457844 | 6.92 | 0.238 | 0.113 | 52.52 |
| 3-methylfuran | 1.91 | 81.28305162 | 7.243 | 0.011 | 0 | 100.00 |
| 1-ethyl-1h-pyrrole | 1.92 | 83.17637711 | 14.943 | 0.083 | 0.069 | 16.87 |
| 2-[(Methylsulfanyl)methyl]furan | 2.00 | 100 | 23.8 | 0.116 | 0.063 | 45.69 |
| 2,5-dimethylfuran | 2.24 | 173.7800829 | 10.657 | 0.021 | 0.008 | 61.90 |
| 2-vinylfuran | 2.26 | 181.9700859 | 11.278 | 0.013 | 0 | 100.00 |
| 1-(2-Furylmethyl)-1H-pyrrole | 2.5 | 316.227766 | 31.528 | 0.014 | 0 | 100.00 |
| 1-Benzofuran | 2.67 | 467.7351413 | 23.948 | 0.012 | 0 | 100.00 |
| 2,2'-Methylenedifuran | 2.99 | 977.237221 | 27.602 | 0.097 | 0.017 | 82.47 |
| 2-(2-Furylmethyl)-5-methylfuran | 3.53 | 3388.441561 | 31.655 | 0.026 | 0 | 100.00 |
| Total Aroma | | | | 7.64 | 7.58 | |

Example 2

Aqueous coffee aroma was stripped from wetted roast and ground and ground *Robusta* coffee and condensed. Coffee was ground to an average size of 2.0-2.2 mm and wetted with hot water to 30% of the roast and ground weight. The coffee was stripped with steam for approximately 6-8 minutes. Steam was supplied to the coffee bed and was collected after passing through the coffee bed. The steam and aqueous coffee aroma was then condensed and chilled to approximately 10° C. After condensation the non-condensable gases were compressed using a liquid ring compressor to 3.1 bara while maintaining a temperature less than 20° C. At this point the non-condensable vapour stream passed through an absorption column which was packed with stainless steel structured packing. The absorbing liquid used was coffee oil. The oil column was maintained at a temperature sufficient for the oil to not freeze. The vapors containing some aqueous aroma and the aroma rich coffee oil were removed from the absorption column for further processing.

The stripped wetted roast and ground coffee was extracted by the method disclosed in EP0826308 on a battery of cells to obtain soluble solids representing approximately 57% of the dry roast and ground coffee weight. The extract was then clarified and subsequently evaporated to obtain a concentrate of soluble coffee solids.

The final aroma stream was added to the concentrated coffee solids and spray dried to produce a soluble coffee powder using standard soluble coffee processing technology.

The invention claimed is:

1. A method of producing an aromatised food or beverage product, the method comprising:
    a) collecting an aroma fraction from a plant material selected from the group consisting of (i) roast and ground coffee and (ii) a coffee extract, in the form of a gas comprising water vapor;
    b) contacting the aroma fraction with an oil to remove at least one undesired aroma compound selected from the group consisting of furans, pyrroles, thiols, and mixtures thereof from the aroma fraction;
    c) separating the oil from the aroma fraction;
    d) condensing the aroma fraction to produce an aqueous aroma containing liquid; and
    e) combining the aqueous aroma containing liquid from which the at least one undesired aroma compound selected from the group consisting of furans, pyrroles, thiols, and mixtures thereof have been removed, with a food or beverage composition to form the aromatised food or beverage product.

2. The method of claim 1 further comprising drying the aromatised food or beverage product to produce a dried aromatized food or beverage product.

3. The method of claim 1, wherein the aroma fraction in the form of a gas is collected by stripping aroma from the plant material with steam.

4. The method of claim 1, wherein the at least one undesired aroma compound removed from the aroma fraction by the contacting of the aroma fraction with the oil comprises furans, pyrroles, and thiols.

5. The method of claim 1, wherein step b) and step c) are performed in a gas-liquid absorption column.

6. The method of claim 1, wherein the plant material comprises coffee extract.

7. The method of claim 6 wherein the plant material is roast and ground coffee beans.

8. The method of claim 7, wherein the food or beverage composition comprises a coffee extract, and the aromatised food or beverage product is an aromatized coffee extract.

9. The method of claim 8, wherein the aroma fraction is collected from roast and ground coffee beans comprising at least 5% by weight of *robusta* coffee beans.

10. The method of claim 8, wherein the coffee extract in step d) has been concentrated to a solids content of at least 10% before being combined with the aqueous aroma containing liquid from which the at least one undesired aroma compound selected from the group consisting of furans, pyrroles, thiols, and mixtures thereof has been removed.

11. The method of claim 8, wherein the coffee extract in step e) has been produced from roasted coffee beans comprising at least 5% by weight of *robusta* coffee beans.

12. The method of claim 1, wherein the food or beverage composition comprises a creamer composition, and the aromatised food or beverage product is an aromatized creamer composition.

13. The method of claim 1, wherein step d) is performed by cooling and/or compression of the aroma fraction to produce the aqueous aroma containing liquid.

14. The method of claim 1, wherein gas from the aroma fraction remaining after step d) is subjected to one or more further condensation steps to produce one or more further aroma fractions.

15. The method of claim 14 wherein at least one of the one or more further aroma fractions is combined with the aqueous aroma containing liquid, from which the at least one undesired aroma compound selected from the group consisting of furans, pyrroles, thiols, and mixtures thereof has been removed, and the food or beverage composition in step e).

16. The method of claim 1, wherein in step e) the aqueous aroma containing liquid, from which the at least one undesired aroma compound selected from the group consisting of furans, pyrroles, thiols, and mixtures thereof has been removed, is oil-free when combined with the food or beverage composition.

17. The method of claim 1, wherein the oil in step b) is MCT oil or coffee oil.

18. The method of claim 1, wherein the aqueous aroma containing liquid, from which the at least one undesired aroma compound selected from the group consisting of furans, pyrroles, thiols, and mixtures thereof has been removed, and the food or beverage composition in step e) are further combined with a second aroma containing liquid produced by a method comprising:

i) collecting an aroma fraction from a plant material in the form of a gas comprising water vapor; and ii) condensing the aroma fraction to produce an aqueous aroma containing liquid.

19. A method of producing an aromatised food or beverage product, the method comprising:
a) collecting an aroma fraction from a plant material selected from the group consisting of roast and ground coffee and a coffee extract, in the form of a gas comprising water vapor;
b) condensing the aroma fraction to produce an aqueous aroma containing liquid;
c) contacting the aqueous aroma containing liquid with an oil to remove at least one undesired aroma compound selected from the group consisting of furans, pyrroles, thiols, and mixtures thereof from the aroma fraction;
d) separating the oil from the aqueous aroma containing liquid; and
e) combining the aqueous aroma containing liquid from which the at least one undesired aroma compound selected from the group consisting of furans, pyrroles, thiols, and mixtures thereof has been removed, with a food or beverage composition to form the aromatised food or beverage product.

20. The method of claim 19, wherein a porous hydrophobic membrane is used to contact the aqueous aroma containing liquid and the oil in step b) and for the separating of the oil from the aroma fraction in step c).

* * * * *